Figure 1:
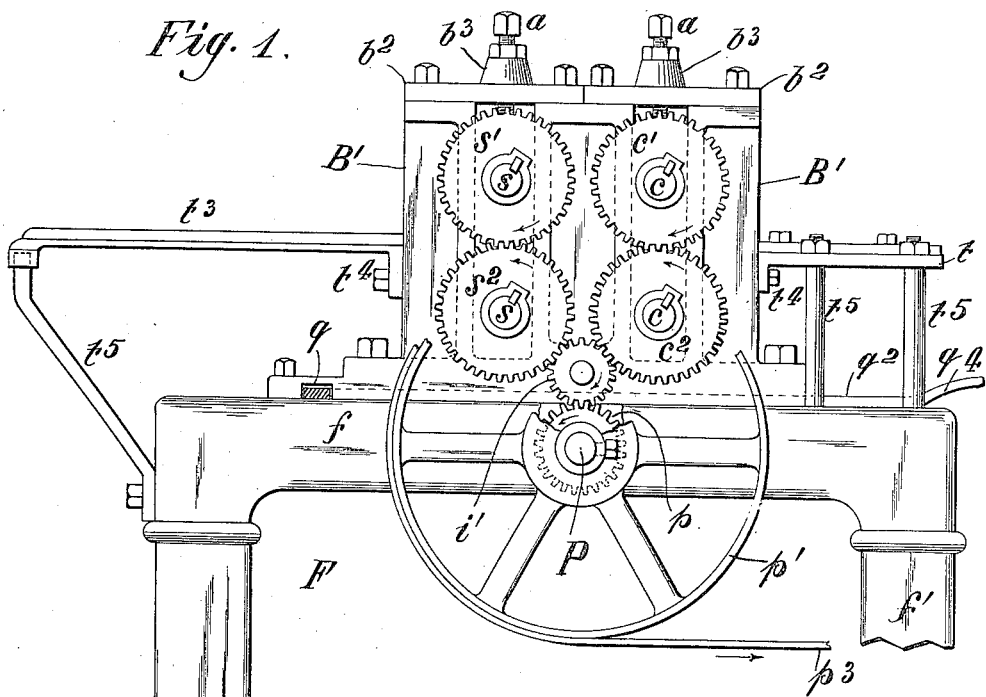

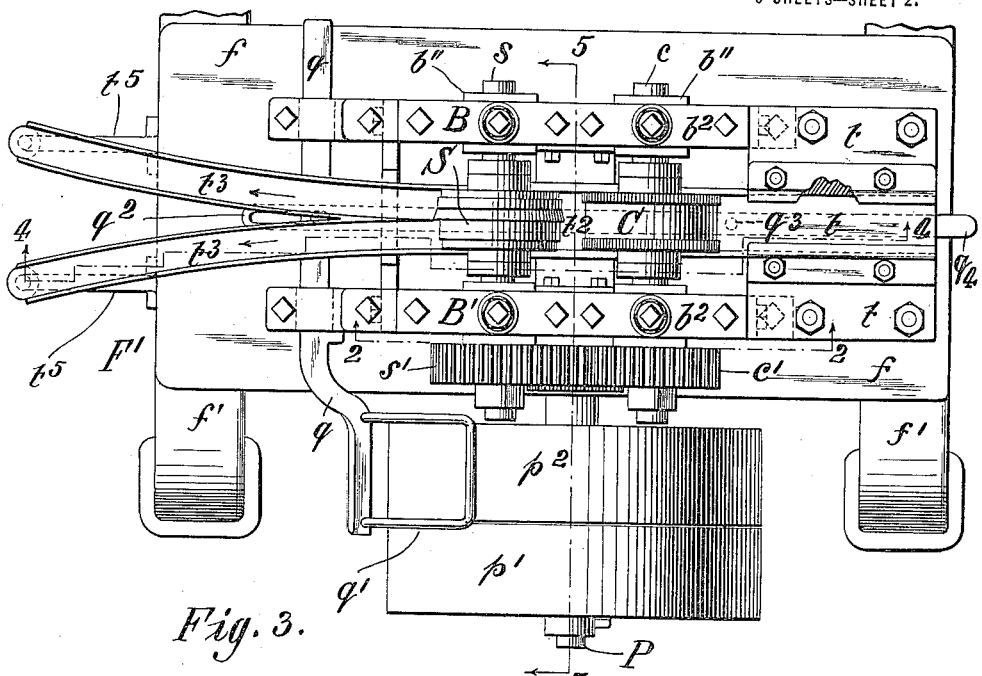
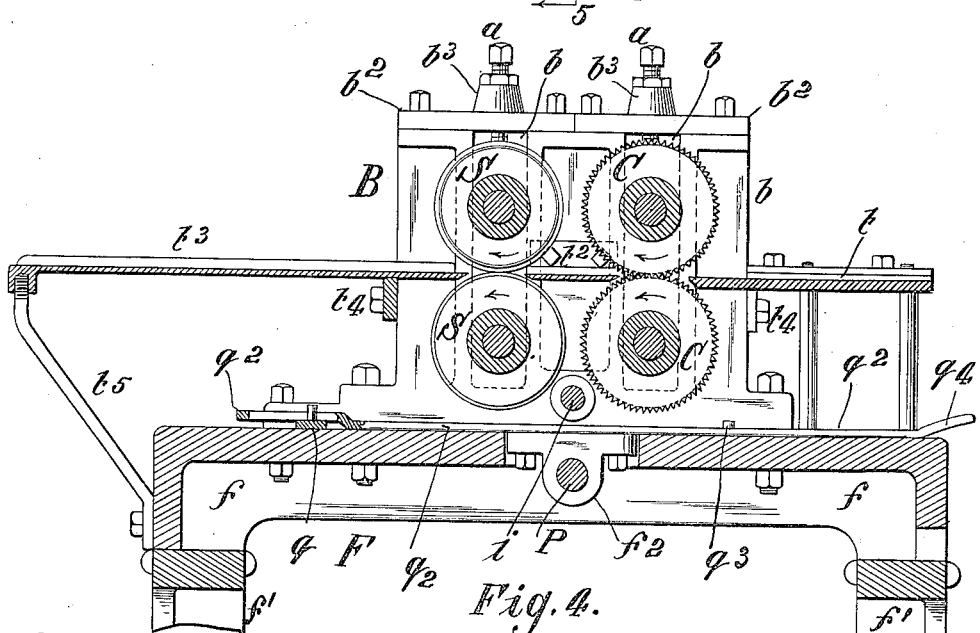

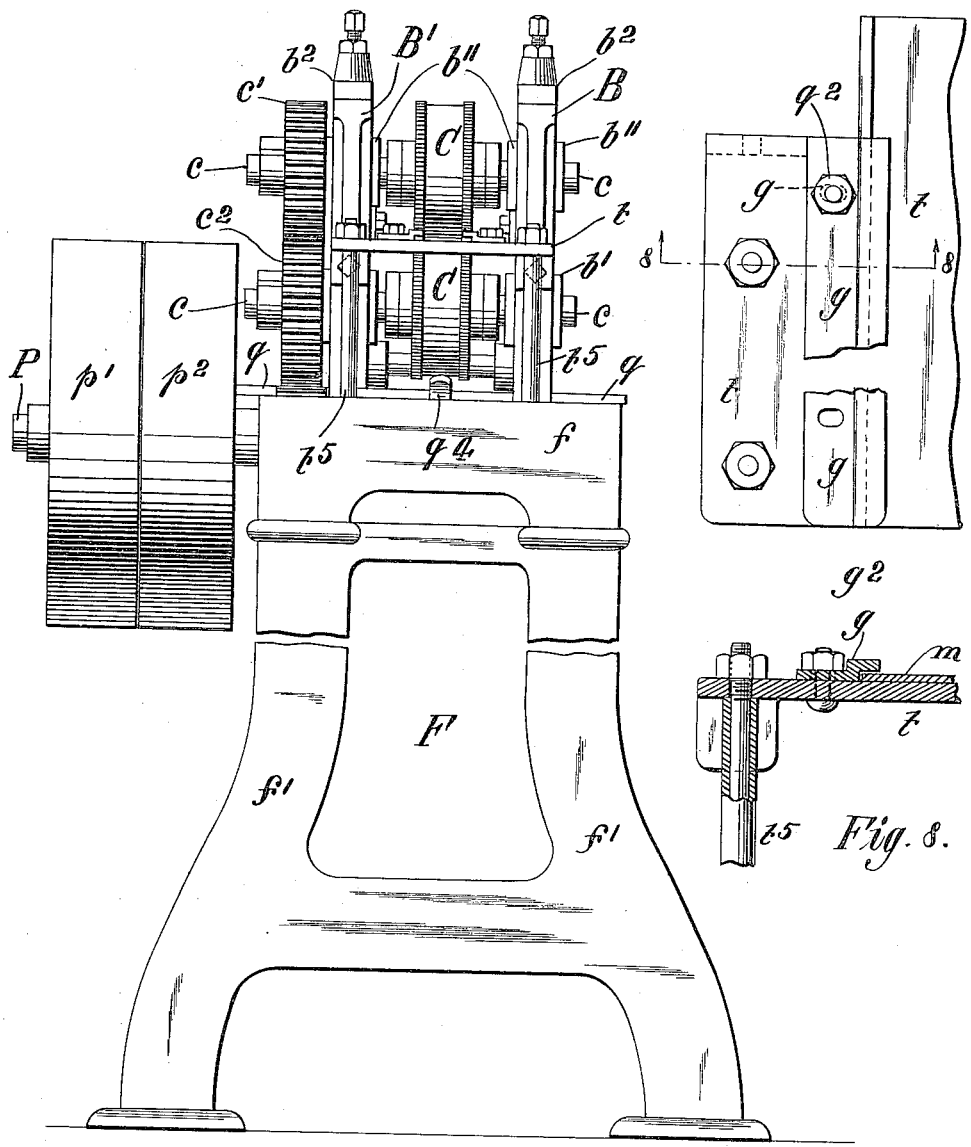

UNITED STATES PATENT OFFICE.

MAX. E. LOBLEY, OF NEW YORK, N. Y., ASSIGNOR TO BROOKLYN COOPERAGE CO., OF BROOKLYN, NEW YORK.

MACHINE FOR MAKING METALLIC HOOPS FOR BARRELS.

1,143,211. Specification of Letters Patent. Patented June 15, 1915.

Application filed January 12, 1915. Serial No. 1,759.

*To all whom it may concern:*

Be it known that I, MAX. E. LOBLEY, a citizen of the United States, and a resident of the borough of Brooklyn, county of Kings, city and State of New York, have invented certain new and useful Improvements in Machines for Making Metallic Hoops for Barrels, of which the following is a specification.

My invention relates to the manufacture of the form of metallic hoop described and claimed in my concurrent application No. 867,285, filed October 19th, 1914,—the distinctive feature of which is a drive edge formed by transversely corrugating one edge of the metallic strip of which the hoop is composed,—the protuberant portions of the corrugations being upon the outer side of the hoop so that the inner side of the hoop contacts with the barrel staves for its full width, driving edge included. The driving edge thus formed readily yields and conforms without injury or distortion to the bending of the strip to form the hoop; the corrugations interlock where the ends of the strip overlap to form the hoop, and thereby strengthen the hoop at its otherwise weakest portion by reinforcing the rivets; and the longitudinal elasticity imparted to the driving edge by the corrugations causes the hoop to adapt itself more perfectly to the external surfaces of the staves, so that the hoop clings thereto in a most effective manner,—the broad, flat contacting surface of the hoop being supplemented by the teeth-like inner undulations of the corrugations which impinge against the staves, embedding themselves therein to some extent, so as to act as retardants against retractile slip, looseness, or play. In the manufacture of these metallic hoops rapid, cheap manipulation is a desideratum, as well as the production of a perfect hoop properly flared to conform to the bilge of the barrel.

Hence the object of my present invention is to afford simple but effective mechanism for crimping the edges of a broad strip of sheet metal, slitting it longitudinally and flaring the resultant narrow strips or ribbons in such manner as to adapt them readily to the making of the barrel hoops by simply cutting the strips into suitable lengths and overlapping and riveting or otherwise securing the ends together. In other words my device may be designated as a crimping, slitting and flaring machine, which, practically at one operation, and certainly at one manipulation or pass of the sheet metal blank, turns out twin strips of hoop ribbon properly crimped and flared, and in condition to be cut transversely into hoop lengths without further manipulation,—the overlapping and securing of the ends being the only other operation necessary in the production of the completed hoop.

The invention consists in the construction and arrangement of parts herein described and claimed specifically, distinctive features being the combination and relative arrangement of the edge crimping and sheet slitting rolls, and the means employed for insuring the proper flaring of the product, all as hereinafter more fully set forth.

Figure 2:
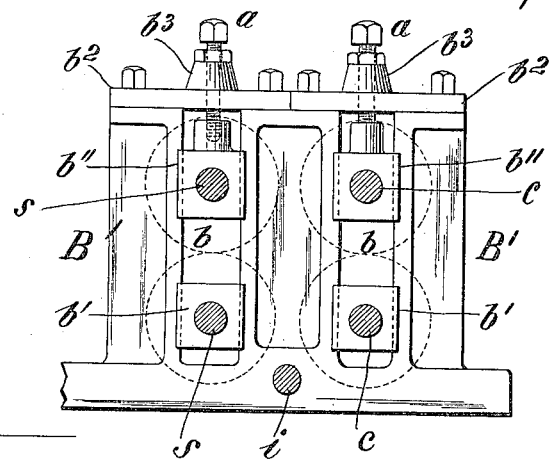
Figure 5:
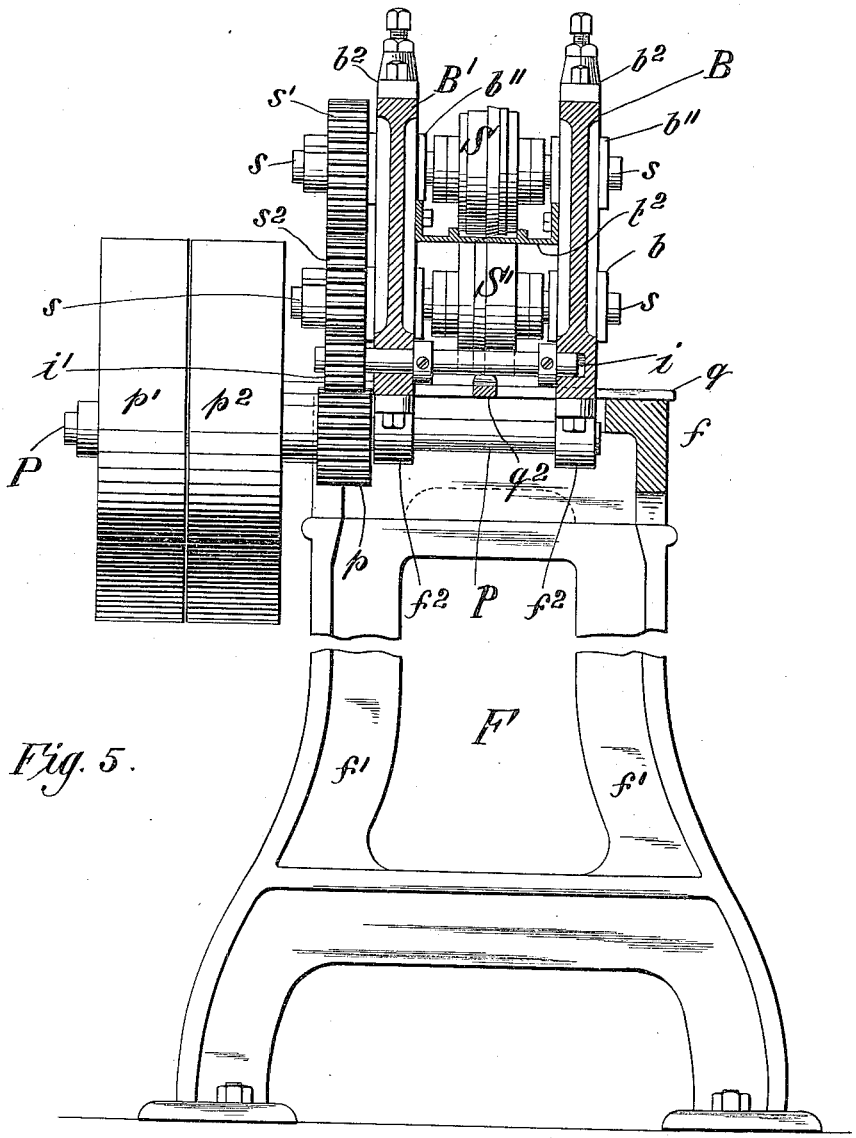
Figure 9:
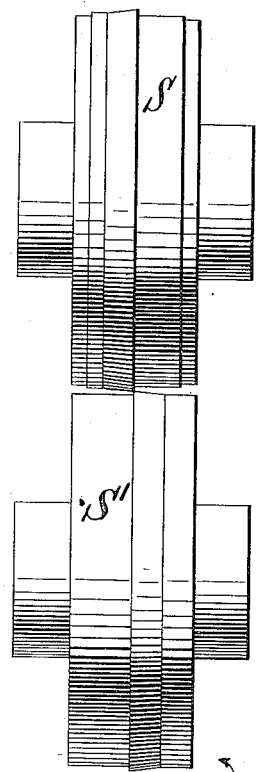
Figure 10:
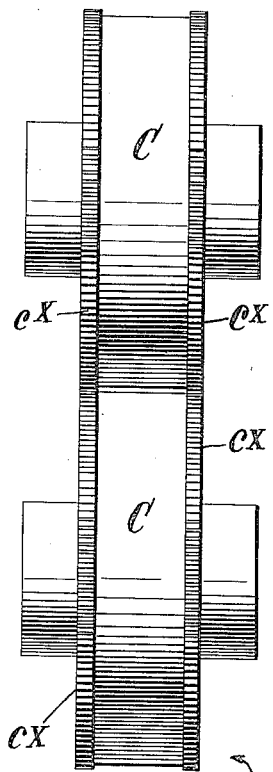
Figure 11:
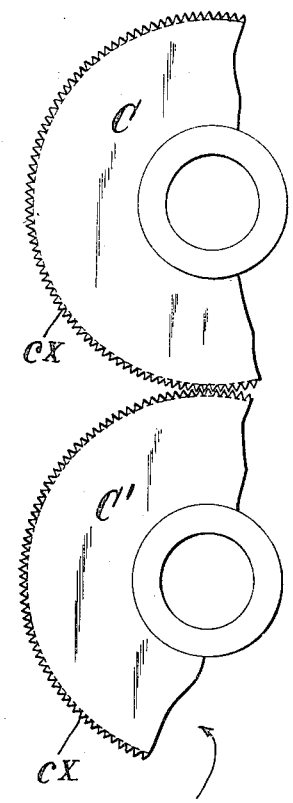
Figure 12:
Figure 13:
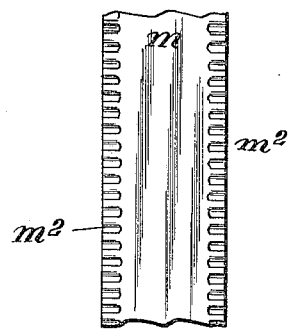
Figure 14:
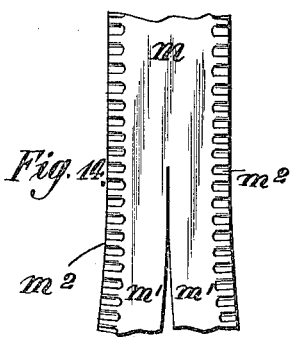
Figure 15:
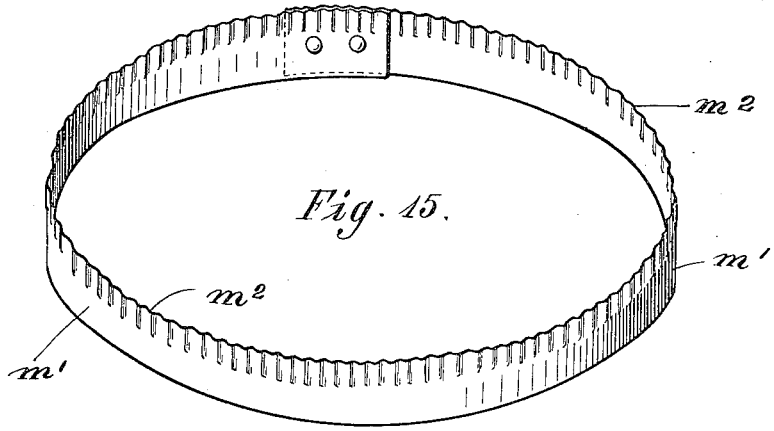
Figure 16:
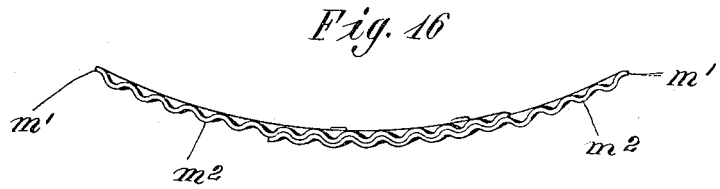
Figure 17:
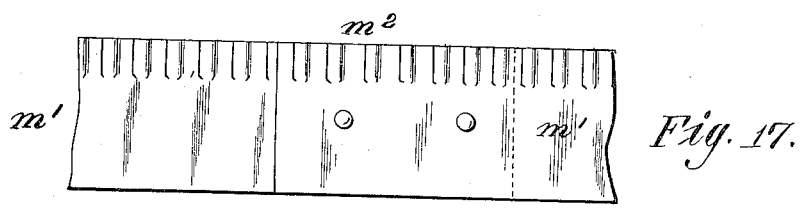
Figure 18:
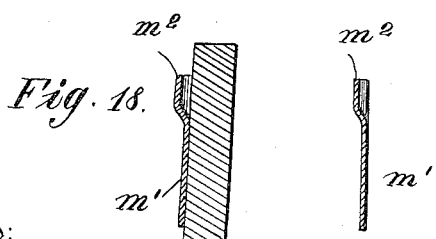
Figure 19:
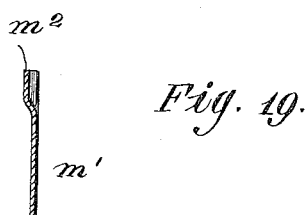

In the accompanying drawings, Figure 1, is a side elevation of my machine, partly broken away; Fig. 2, is a sectional elevation of a portion thereof taken upon plane of line 2—2 Fig. 3; Fig. 3, is a top view of the machine broken away in part; Fig. 4, is a longitudinal sectional elevation taken upon plane of line 4—4 Fig. 3; Fig. 5, is a transverse sectional elevation, taken upon plane of line 5—5 Fig. 3; Fig. 6, is an end elevation; Fig. 7, a detail of one of the feed side guides and adjacent parts; Fig. 8, a sectional elevation taken upon plane of line 8—8 Fig. 7; Fig. 9, is a face elevation of the shearing rolls; Fig. 10, a face elevation of the crimping rolls; Fig. 11, a side elevation of portions of the crimping rolls; Fig. 12, a view of a portion of the sheet metal blank; Fig. 13, a view of the same after crimping; Fig. 14, a view of the same, partly sheared longitudinally; Fig. 15, is a perspective view of the drive hoop made from the hoop ribbon; Fig. 16, an edge view of the overlapping ends thereof; Fig. 17, a front view of the parts shown in Fig. 16; Fig. 18, a cross section of the hoop and adjacent portion of the stave; and Fig. 19, a cross section of the drive hoop.

F, represents the basic frame of the machine consisting of the table $f$, supported on the leg members $f'$, $f'$. On the table are rigidly secured the bearing standards B, B', formed with vertical ways $b$, $b$, within which fit slidably the journal boxes $b'$, $b''$, in which the roll shafts $c$, $c$, and $s$, $s$, are mounted. The upper ends of the ways $b$, $b$, are closed by screw caps $b^2$, $b^2$, formed with threaded bosses $b^3$, $b^3$, for the engagement of the adjusting screws $a$, $a$, which also engage with threaded bosses on the upper journal boxes $b''$, $b''$, as shown more particularly in Fig. 2. On the shafts $c$, $c$, are rigidly mounted the crimping rolls C, C', and on the shafts $s$, $s$, the shearing rolls S, S'. The adjusting screws $a$, $a$, afford means whereby the superposed crimping rolls C, C', and the superposed shearing rolls S, S', may be adjusted with relation to each other in a manner well known, and for purposes well known, in the art.

Rigidly mounted on the shafts $c$, $c$, are the intermeshing gears $c'$, $c^2$, and in like manner on the shafts $s$, $s$, are rigidly mounted the intermeshing gears $s'$, $s^2$, the lower gears $c^2$, $s^2$, of each set meshing with the intermediate pinion $i'$, so that, as will be seen particularly by reference to Fig. 1, the crimping rolls C, C', and the shearing rolls S, S', will travel respectively in the same relative directions. That is to say the intermediate pinion $i'$, being made to rotate in the direction indicated by the arrow thereon in Fig. 1, the lower rolls C', S', rotate from right to left, and the upper rolls C, S, from left to right, as also indicated by arrows in Fig. 1, and in Fig. 4.

The intermediate pinion $i'$, is rigidly secured to the counter-shaft $i$, mounted in and between the bases of the standards B, B', and meshes with the power pinion $p$, on the power shaft P, as shown in Figs. 1, and 5. The power shaft P, is mounted in bearings $f^2$, $f^2$, secured to the under side of the table bed $f$, as shown in Figs. 4, and 5. The power shaft P, carries the usual power pulley $p'$, and idler $p^2$, the power belt $p^3$, (Fig. 1,) being charged from one to the other by any desired form of belt shifting device, that shown in the drawings consisting of the slide bar $q$, formed with the belt loop $q'$, and actuated through the medium of the shifting lever $q^2$, fulcrumed to the top of the table at $q^3$, and provided with the handle $q^4$, or any other well known or equivalent means of transmitting power to, and controlling the operation of, the rolls may be substituted, as may be preferred, with like result in so far as my invention is concerned.

The guide or runway for the support of the sheet metal blanks to be operated upon consists of the primary or reception table $t$, the intermediate table $t^2$, between the rolls, and the bifurcated discharge table $t^3$. These are supported rigidly upon or with relation to the stationary parts of the machine by any suitable means, as by being bolted to the bearing standards B, B', as at $t^4$, by leg brackets $t^5$, attached to the table $f$, or by any other means that may be found expedient,—the essential feature in this connection being the presentation of the sheet metal in proper alinement to the crimping and shearing rolls, and the support of the resultant product as discharged therefrom.

The reception table $t$, is provided with guides $g$, $g$, for the lateral support of the edges of the sheet metal blank $m$, fed thereto, and these lateral guides $g$, $g$, are preferably made adjustable laterally for accuracy and to adapt them to the use of different widths of rolls and sheet metal blanks. This adjustability may obviously be provided for by resort to various mechanical expedients, that shown in the drawings consisting in forming the guide plates $g$, $g$, with transverse slots $g'$, $g'$, to accommodate the binding screws $g^2$, $g^2$, by which said guide plates $g$, $g$, are held in position on the table $t$.

The strip of sheet metal blank $m$, used is double the width of the hoop ribbons $m'$, $m'$, desired, and is fed over the table $t$, between the guides $g$, $g$, to the crimping roll C, C', the serrated edges $c^x$, $c^x$, of which cramp and bend the edges of the strip $m$, between them,—it being understood of course that the opposed teeth $c^x$, $c^x$, of the roll C, C', intermesh more or less, with the edges of the strip between them, thus forming corrugations of the required width and depth.

The flaring of the resultant hoop ribbons $m'$, $m'$, is effected by the combined action of the crimping rolls C, C', and the shearing rolls S, S', in that the process of crimping tends to contract the longitudinal edges, putting the central portion of the sheet metal blank in a state of tension which is immediately (practically) relieved by the shearing rolls S, S', which thus virtually act as shearing and flare-releasing rolls, since the result of their action is to cause the hoop strips $m'$, $m'$, to spread outward from the corrugated edges $m^2$, $m^2$,—this flaring and curving under relief from central tension being provided for in the machine by the bifurcated runways $t^3$, $t^3$, shown in Fig. 3. The hoop ribbons $m'$, $m'$, thus formed are cut into suitable lengths, the ends of which are made to overlap as shown in Figs. 15, to 17, inclusive, with the superposed corrugations $m^2$, interlocking,—the ends being then secured together by riveting or otherwise, as found most expedient, to form the flared hoop shown in Fig. 15.

The shearing rolls permit the inherent resiliency of the edges to flare the strip. Arranging the shearing rolls immediately after the edge crimping rolls whereby the strip is cut between the crimps serves to produce the flare. The contracting of the longitudinal edges of the strip by the process of crimping puts the central portion of the strip under tension which is immediately compensated for by the action of the shearing rolls which serve to spread the severed strips outward from the corrugated edges.

What I claim as my invention and desire to secure by Letters Patent is,

1. In a machine of the character designated, the combination of crimping rolls constructed and arranged to crimp the edges only of a strip, and shearing rolls arranged in close proximity thereto to sever the strip between the corrugations and to produce a flare in the severed strips.

2. In a machine of the character designated, the combination of crimping rolls and shearing rolls arranged to act in conjunction therewith and to sever the uncrimped portion of the strip immediately after the edges thereof are crimped by the crimping rolls.

3. In a machine of the character designated, the combination of crimping rolls and shearing rolls arranged to act in conjunction therewith and to sever the uncrimped portion of the strip immediately after the edges thereof are crimped by the crimping rolls and a discharge runway for receiving and separating the severed strips.

4. In a machine of the character designated, a crimping roll, and a shearing roll arranged to act in conjunction therewith and to immediately follow the action of crimping whereby a flare is produced in the sheared strip.

5. In a machine of the character designated, a pair of rolls adapted to crimp the edges only of a sheet metal blank and a set of rolls immediately succeeding the crimping rolls and adapted to shear the blank between the crimps thereof.

6. In a machine of the character designated, a pair of rolls adapted to crimp the edges only of a sheet metal blank and a set of rolls immediately succeeding the crimping rolls and adapted to shear the blank between the crimps thereof, the edges of the strip being flared by the inherent resiliency thereof.

7. In a machine of the character designated, a pair of rolls adapted to crimp the edges only of a sheet metal blank and a set of rolls immediately succeeding the crimping rolls and adapted to shear the blank between the crimps thereof, the edges of the strip being flared by the inherent resiliency thereof and a bifurcated feedway for the severed strips.

8. In a machine of the character designated, a pair of rolls adapted to crimp the edges only of a sheet metal blank and a set of rolls immediately succeeding the crimping rolls and adapted to shear the blank between the crimps thereof, the edges of the strip being flared by the inherent resiliency thereof and a bifurcated feedway for the severed strips, the shearing rolls having their cutting edges disposed in alinement between the crimping portions of the crimping rolls.

9. In a machine of the character designated, the combination of a set of rolls adapted to crimp the edges of a sheet metal blank, and a succeeding set of rolls adapted to shear the crimped blank and supporting means for the blank consisting of a feed table to the crimping rolls, an intermediate supporting table between said crimping rolls and said shearing rolls and a discharge runway which is bifurcated and adapted to receive, separate, and conduct the twin metallic ribbons resultant from the action of said crimping and shearing rolls, as and for the purpose set forth.

10. The method herein set forth of forming metallic hoop ribbons consisting in corrugating the longitudinal edges only of a blank of sheet metal and then shearing the same centrally and longitudinally and flaring the component parts, as and for the purpose set forth.

11. The herein described method of forming metallic hoop ribbons, which consists in crimping the edges only of a sheet metal strip, slitting it longitudinally and flaring the resultant strips by spreading them outward from their corrugated edges.

12. The herein described method of forming metallic hoop ribbons, which consists in corrugating the longitudinal edges only of a sheet metal blank, severing the blank between the corrugated portions and flaring and curving the same under relief from central tension.

MAX. E. LOBLEY.

Witnesses:
THOMAS A. SULLIVAN,
GEO. WM. MIATT.

Copies of this patent may be obtained for five cents each, by addressing the "Commissioner of Patents, Washington, D. C."